(12) United States Patent
Pan (10) Patent No.: US 7,973,592 B2
(45) Date of Patent: Jul. 5, 2011

(54) CHARGE PUMP WITH CURRENT BASED REGULATION

(75) Inventor: Feng Pan, Fremont, CA (US)

(73) Assignee: SanDisk Corporation, Milpitas, CA (US)

(*) Notice: Subject to any disclaimer, the term of this patent is extended or adjusted under 35 U.S.C. 154(b) by 0 days.

(21) Appl. No.: 12/506,998

(22) Filed: Jul. 21, 2009

(65) Prior Publication Data
US 2011/0018615 A1      Jan. 27, 2011

(51) Int. Cl.
G05F 1/10      (2006.01)
(52) U.S. Cl. .......................... 327/536; 363/60
(58) Field of Classification Search .................. None
See application file for complete search history.

(56) References Cited

U.S. PATENT DOCUMENTS

| | | |
|---|---|---|
| 3,697,860 A | 10/1972 | Baker |
| 4,511,811 A | 4/1985 | Gupta |
| 4,583,157 A | 4/1986 | Kirsch et al. |
| 4,636,748 A | 1/1987 | Latham |
| 4,736,121 A | 4/1988 | Cini et al. |
| 4,888,738 A | 12/1989 | Wong et al. |
| 5,168,174 A | 12/1992 | Naso et al. |
| 5,175,706 A | 12/1992 | Edme |
| 5,263,000 A | 11/1993 | Van Buskirk et al. |
| 5,392,205 A | 2/1995 | Zavaleta |
| 5,436,587 A | 7/1995 | Cernea |
| 5,483,434 A | 1/1996 | Seesink |
| 5,508,971 A | 4/1996 | Cernea et al. |
| 5,521,547 A | 5/1996 | Tsukada |
| 5,563,779 A | 10/1996 | Cave et al. |
| 5,563,825 A | 10/1996 | Cernea et al. |
| 5,568,424 A | 10/1996 | Cernea et al. |
| 5,592,420 A | 1/1997 | Cernea et al. |
| 5,596,532 A | 1/1997 | Cernea et al. |
| 5,621,685 A | 4/1997 | Cernea et al. |
| 5,625,544 A | 4/1997 | Kowshik et al. |
| 5,693,570 A | 12/1997 | Cernea et al. |
| 5,734,286 A | 3/1998 | Takeyama et al. |
| 5,818,766 A | 10/1998 | Song |

(Continued)

FOREIGN PATENT DOCUMENTS

DE      10 2007 026290      7/2008

(Continued)

OTHER PUBLICATIONS

Feng Pan et al., "Charge Pump Circuit Design", McGraw-Hill, 2006, 26 pages.

(Continued)

*Primary Examiner* — Lincoln Donovan
*Assistant Examiner* — Sibin Chen
(74) *Attorney, Agent, or Firm* — Davis Wright Tremaine LLP (57) ABSTRACT

A charge pump system using a current based regulation method, in addition to the typical voltage based regulation methods is presented. The current flow in the charge pump is determined independently of the output voltage. By sensing the current going through the charge pump while its output is being regulated to the target level, the strength of charge pump can be dynamically adjusted in term of regulation level, branch assignment, clock frequency, clock amplitude, and so on. Indirectly sensing the current going through pump (not in serial with output stage to allow additional IR drop) will allow the pumps to have matrix of V and I to better adjust the charge pump parameters for current saving and ripple reduction.

26 Claims, 6 Drawing Sheets

U.S. PATENT DOCUMENTS

| | | |
|---|---|---|
| 5,943,226 A | 8/1999 | Kim |
| 5,945,870 A | 8/1999 | Chu et al. |
| 5,969,565 A | 10/1999 | Naganawa |
| 5,973,546 A | 10/1999 | Le et al. |
| 5,982,222 A | 11/1999 | Kyung |
| 6,008,690 A | 12/1999 | Takeshima et al. |
| 6,018,264 A | 1/2000 | Jin |
| 6,023,187 A | 2/2000 | Camacho et al. |
| 6,026,002 A | 2/2000 | Viehmann |
| 6,104,225 A | 8/2000 | Taguchi et al. |
| 6,107,862 A | 8/2000 | Mukainakano et al. |
| 6,134,145 A | 10/2000 | Wong |
| 6,154,088 A | 11/2000 | Chevallier et al. |
| 6,188,590 B1 | 2/2001 | Chang et al. |
| 6,198,645 B1 | 3/2001 | Kotowski et al. |
| 6,208,198 B1 | 3/2001 | Lee |
| 6,249,445 B1 | 6/2001 | Sugasawa |
| 6,249,898 B1 | 6/2001 | Koh et al. |
| 6,285,622 B1 | 9/2001 | Haraguchi et al. |
| 6,314,025 B1 | 11/2001 | Wong |
| 6,320,796 B1 | 11/2001 | Voo et al. |
| 6,329,869 B1 | 12/2001 | Matano |
| 6,344,959 B1 | 2/2002 | Milazzo |
| 6,344,984 B1 | 2/2002 | Miyazaki |
| 6,359,798 B1 | 3/2002 | Han et al. |
| 6,370,075 B1 | 4/2002 | Haeberli et al. |
| 6,400,202 B1 | 6/2002 | Fifield et al. |
| 6,404,274 B1 | 6/2002 | Hosono et al. |
| 6,424,570 B1 | 7/2002 | Le et al. |
| 6,445,243 B2 | 9/2002 | Myono |
| 6,456,170 B1 | 9/2002 | Segawa et al. |
| 6,476,666 B1 | 11/2002 | Palusa et al. |
| 6,486,728 B2 | 11/2002 | Kleveland |
| 6,518,830 B2 | 2/2003 | Gariboldi et al. |
| 6,525,614 B2 | 2/2003 | Tanimoto |
| 6,525,949 B1 | 2/2003 | Johnson et al. |
| 6,531,792 B2 | 3/2003 | Oshio |
| 6,538,930 B2 * | 3/2003 | Ishii et al. ............... 365/189.09 |
| 6,545,529 B2 | 4/2003 | Kim |
| 6,556,465 B2 | 4/2003 | Wong et al. |
| 6,577,535 B2 | 6/2003 | Pasternak |
| 6,606,267 B2 | 8/2003 | Wong |
| 6,724,241 B1 | 4/2004 | Bedarida et al. |
| 6,734,718 B1 | 5/2004 | Pan |
| 6,760,262 B2 | 7/2004 | Haeberli et al. |
| 6,781,440 B2 | 8/2004 | Huang |
| 6,798,274 B2 | 9/2004 | Tanimoto |
| 6,801,454 B2 | 10/2004 | Wang et al. |
| 6,819,162 B2 | 11/2004 | Pelliconi |
| 6,834,001 B2 | 12/2004 | Myono |
| 6,859,091 B1 | 2/2005 | Nicholson et al. |
| 6,878,981 B2 * | 4/2005 | Eshel ............................ 257/299 |
| 6,891,764 B2 | 5/2005 | Li |
| 6,894,554 B2 | 5/2005 | Ito |
| 6,922,096 B2 | 7/2005 | Cernea |
| 6,944,058 B2 | 9/2005 | Wong |
| 6,975,135 B1 | 12/2005 | Bui |
| 6,990,031 B2 | 1/2006 | Hashimoto et al. |
| 6,995,603 B2 | 2/2006 | Chen et al. |
| 7,002,381 B1 | 2/2006 | Chung |
| 7,023,260 B2 | 4/2006 | Thorp et al. |
| 7,030,683 B2 | 4/2006 | Pan et al. |
| 7,113,023 B2 | 9/2006 | Cernea |
| 7,116,154 B2 | 10/2006 | Guo |
| 7,116,155 B2 | 10/2006 | Pan |
| 7,120,051 B2 | 10/2006 | Gorobets et al. |
| 7,129,759 B2 * | 10/2006 | Fukami ........................ 327/110 |
| 7,135,910 B2 | 11/2006 | Cernea |
| 7,135,911 B2 | 11/2006 | Imamiya |
| 7,208,996 B2 | 4/2007 | Suzuki et al. |
| 7,224,591 B2 * | 5/2007 | Kaishita et al. ................ 363/60 |
| 7,227,780 B2 | 6/2007 | Komori et al. |
| 7,239,192 B2 | 7/2007 | Tailliet |
| 7,253,676 B2 | 8/2007 | Fukada et al. |
| 7,259,612 B2 | 8/2007 | Saether |
| 7,276,960 B2 | 10/2007 | Peschke |
| 7,345,335 B2 | 3/2008 | Watanabe |
| 7,345,928 B2 | 3/2008 | Li |
| 7,368,979 B2 | 5/2008 | Govindu et al. |
| 7,372,320 B2 | 5/2008 | Pan |
| 7,397,677 B1 | 7/2008 | Collins et al. |
| 7,440,342 B2 | 10/2008 | Pan |
| 7,443,735 B2 | 10/2008 | Pan |
| 7,463,521 B2 | 12/2008 | Li |
| 7,468,628 B2 | 12/2008 | Im et al. |
| 7,521,978 B2 | 4/2009 | Kim et al. |
| 7,554,311 B2 | 6/2009 | Pan |
| 7,579,903 B2 | 8/2009 | Oku |
| 7,671,572 B2 | 3/2010 | Chung |
| 7,772,914 B2 | 8/2010 | Jung |
| 2002/0014908 A1 | 2/2002 | Lauterbach |
| 2002/0075706 A1 | 6/2002 | Foss et al. |
| 2002/0140463 A1 | 10/2002 | Cheung |
| 2003/0128560 A1 | 7/2003 | Saiki et al. |
| 2003/0214346 A1 | 11/2003 | Pelliconi |
| 2005/0093614 A1 | 5/2005 | Lee |
| 2005/0195017 A1 | 9/2005 | Chen et al. |
| 2005/0237103 A1 | 10/2005 | Cernea |
| 2005/0248386 A1 | 11/2005 | Pan et al. |
| 2006/0114053 A1 | 6/2006 | Sohara et al. |
| 2006/0244518 A1 | 11/2006 | Byeon et al. |
| 2007/0001745 A1 | 1/2007 | Yen |
| 2007/0069805 A1 | 3/2007 | Choi et al. |
| 2007/0126494 A1 | 6/2007 | Pan |
| 2007/0139099 A1 | 6/2007 | Pan |
| 2007/0139100 A1 | 6/2007 | Pan |
| 2007/0222498 A1 | 9/2007 | Choy et al. |
| 2007/0229149 A1 | 10/2007 | Pan et al. |
| 2008/0024096 A1 | 1/2008 | Pan |
| 2008/0111604 A1 * | 5/2008 | Boerstler et al. .............. 327/175 |
| 2008/0116963 A1 | 5/2008 | Jung |
| 2008/0157852 A1 | 7/2008 | Pan |
| 2008/0157859 A1 | 7/2008 | Pan |
| 2008/0198662 A1 | 8/2008 | Mokhlesi |
| 2008/0218134 A1 | 9/2008 | Kawakami |
| 2008/0239802 A1 | 10/2008 | Thorpe |
| 2008/0239856 A1 | 10/2008 | Thorpe |
| 2008/0278222 A1 | 11/2008 | Conti et al. |
| 2009/0033306 A1 | 2/2009 | Tanzawa |
| 2009/0051413 A1 | 2/2009 | Chu et al. |
| 2009/0058506 A1 | 3/2009 | Nandi et al. |
| 2009/0058507 A1 | 3/2009 | Nandi et al. |
| 2009/0091366 A1 | 4/2009 | Baek et al. |
| 2009/0121780 A1 | 5/2009 | Chen et al. |
| 2009/0153230 A1 | 6/2009 | Pan et al. |
| 2009/0153231 A1 | 6/2009 | Pan et al. |
| 2009/0153232 A1 | 6/2009 | Fort et al. |
| 2009/0167418 A1 | 7/2009 | Ragavan |
| 2009/0219077 A1 | 9/2009 | Pietri et al. |
| 2010/0244935 A1 | 9/2010 | Kim et al. |

FOREIGN PATENT DOCUMENTS

| | | |
|---|---|---|
| EP | 0 382 929 A | 8/1990 |
| EP | 0 780 515 A | 6/1997 |
| WO | 01/06336 A1 | 1/2001 |
| WO | WO 2006/132757 | 12/2006 |

OTHER PUBLICATIONS

Louie Pylarinos et al., "Charge Pumps: An Overview", Department of Electrical and Computer Engineering University of Toronto, 7 pages.

Ang et al., "An On-Chip Voltage Regulator Using Switched Decoupling Capacitors," 2000 IEEE International Solid-State Circuits Conference, 2 pages.

U.S. Appl. No. 12/135,945, entitled "Charge Pump with Vt Cancellation Through Parallel Structure," filed Jun. 9, 2008, 18 pages.

U.S. Appl. No. 12/144,808, entitled "Clock Generator Circuit for a Charge Pump," filed Jun. 24, 2008, 15 pages.

U.S. Appl. No. 12/146,243, entitled "Techniques of Ripple Reduction for Charge Pumps," filed Jun. 25, 2008, 16 pages.

U.S. Appl. No. 12/337,050, entitled "Regulation of Recovery Rates in Charge Pumps," filed Dec. 17, 2008, 17 pages.

* cited by examiner

Charging Half Cycle

FIG. 1A

Transfer Half Cycle

CHARGE PUMP WITH CURRENT BASED REGULATION

FIELD OF THE INVENTION

This invention pertains generally to the field of charge pumps and more particularly to techniques for regulating charge pumps.

BACKGROUND

Figure 1A:
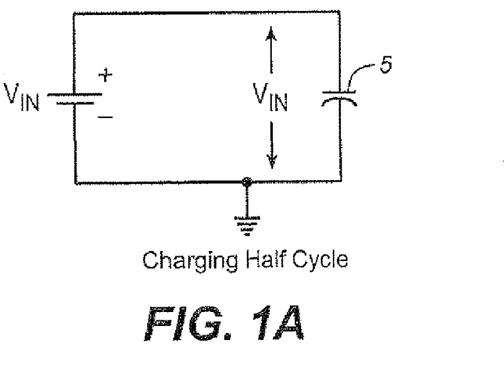
FIG. 1a is a simplified circuit diagram of the charging half cycle in a generic charge pump.
Figure 1B:
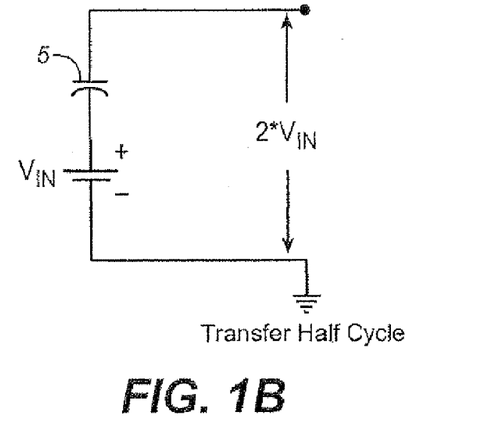
FIG. 1b is a simplified circuit diagram of the transfer half cycle in a generic charge pump.

Charge pumps use a switching process to provide a DC output voltage larger or lower than its DC input voltage. In general, a charge pump will have a capacitor coupled to switches between an input and an output. During one clock half cycle, the charging half cycle, the capacitor couples in parallel to the input so as to charge up to the input voltage. During a second clock cycle, the transfer half cycle, the charged capacitor couples in series with the input voltage so as to provide an output voltage twice the level of the input voltage. This process is illustrated in FIGS. 1a and 1b. In FIG. 1a, the capacitor 5 is arranged in parallel with the input voltage $V_{IN}$ to illustrate the charging half cycle. In FIG. 1b, the charged capacitor S is arranged in series with the input voltage to illustrate the transfer half cycle. As seen in FIG. 1b, the positive terminal of the charged capacitor 5 will thus be $2*V_{IN}$ with respect to ground.

Charge pumps are used in many contexts. For example, they are used as peripheral circuits on flash and other non-volatile memories to generate many of the needed operating voltages, such as programming or erase voltages, from a lower power supply voltage. A number of charge pump designs, such as conventional Dickson-type pumps, are know in the art. But given the common reliance upon charge pumps, there is an on going need for improvements in pump design, particularly with respect to trying to save on current consumption and reduce the amount ripple in the output of the pump.

SUMMARY OF THE INVENTION

A charge pump circuit system is described. The charge pump system includes a charge pump circuit, connected to receive an input voltage and generate from it an output having a voltage level, and regulation circuitry connected to the charge pump circuit. The regulation circuitry includes a voltage comparison section connected to receive the output and a reference voltage and derive from the voltage level the output and the reference voltage a first control signal and a current determination section connected to the charge pump circuit to indirectly determine the amount of current flowing through the charge pump circuit and determine a second control signal based upon the determined amount of current. The regulation circuitry also includes a pump control section connected to receive the first and second control signals and derive from them a third control signal, where the charge pump system adapts the operation of the charge pump circuit in response to the third control signal.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

BRIEF DESCRIPTION OF THE DRAWINGS

The various aspects and features of the present invention may be better understood by examining the following figures, in which.

DETAILED DESCRIPTION

The techniques presented here are widely applicable to various charge pump designs to reduce overall current consumption for charge pump and for output voltage ripple reduction. In a principle aspect, this is done by using a current based regulation method in addition to the typical voltage based regulation methods, where the current flow in the charge pump is determined independently of the output voltage. By sensing the current going through the charge pump while its output is being regulated to the target level, the strength of charge pump can be dynamically adjusted in term of regulation level, branch assignment, clock frequency, clock amplitude, and so on. Relying only on the regulation on output voltage may not achieve best power consumption or ripple reduction since this would only look at the voltage plus noise of voltage. Indirectly sensing the current going through pump (not in serial with output stage to allow additional IR drop) will allow the pumps to have matrix of V and I to better adjust the charge pump parameters for current saving and ripple reduction.

In the following, the description will primarily be based on an exemplary embodiment using a Dickson-type pump (where each branch is made up of a number of series connected diodes with one side of a capacitor connected between each pair of diodes), but the concepts can also be applied to other pump designs. More information on prior art charge pumps, such Dickson type pumps and charge pumps generally, can be found, for example, in "Charge Pump Circuit Design" by Pan and Samaddar, McGraw-Hill, 2006, or "Charge Pumps: An Overview", Pylarinos and Rogers, Department of Electrical and Computer Engineering University of Toronto, available on the webpage "www.eecg.toronto.edu/~kphang/ece1371/chargepumps.pdf". Further information on various other charge pump aspects and designs can be found in U.S. Pat. Nos. 5,436,587; 6,370,075; 6,556,465; 6,760,262; 6,922,096; 7,030,683; 7,554,311; 7,368,979; and 7,135,910; US Patent Publication numbers 2009-0153230-A1; 2009-0153232-A1; and 2009-0058506-A1; and U.S. applications Ser. No. 11/295,906 filed on Dec. 6, 2005; U.S. Ser. No. 11/303,387 filed on Dec. 16, 2005; U.S. Ser. No. 11/845,939, filed Aug. 28, 2007; U.S. Ser. No. 12/144,808 filed on Jun. 24, 2008; U.S. Ser. No. 12/135,948 filed Jun. 9, 2008; U.S. Ser. No. 12/146,243 filed Jun. 25, 2008; and U.S.

Ser. No. 12/337,050 filed Dec. 17, 2008. Examples of a pump system with a variable number of branches can be found, for example, in U.S. Pat. No. 5,781,473 and with a variable number of stages can be found, for example, in U.S. Pat. No. 6,370,075.

Figure 2:
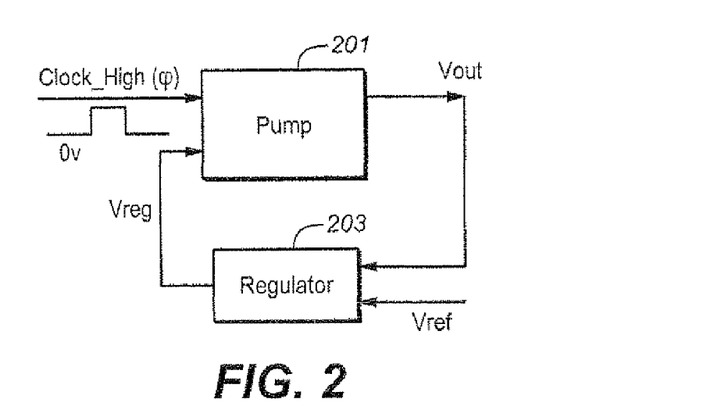
FIG. 2 is a top-level block diagram for a regulated charge pump.

FIG. 2 is a top-level block diagram of a typical charge pump using an output voltage based regulation scheme. As shown in FIG. 2, the pump 201 has as inputs a clock signal and a voltage Vreg and provides an output Vout. The clock generation circuit is not explicitly shown in FIG. 2, although it may be considered part of the charge pump system in some embodiments or taken as an external input. The high (Vdd) and low (ground) connections are also not explicitly shown. The voltage Vreg is provided by the regulator 203, which has as inputs a reference voltage Vref from an external voltage source and the output voltage Vout. The regulator block 203 generates feedback control signal Vreg such that the desired value of Vout can be obtained. The pump section 201 may have any of various designs for charge pumps, such as described in the various references cited above including charge doubler-type circuits with cross-coupled elements as well as the Dickson-type pumps described below for the exemplary embodiments. (A charge pump is typically taken to refer to both the pump portion 201 and the regulator 203, when a regulator is included, although in some usages "charge pump" refers to just the pump section 201. In the following, the terminology "charge pump system" will often be used to describe pump itself as well as any)

Figure 3:
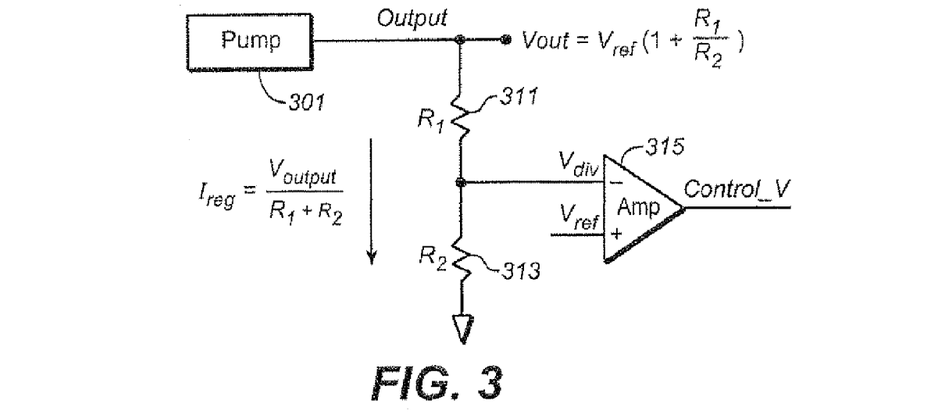
FIGS. 3 and 4 illustrate resistive divider feedback regulation and corresponding regulation of a charge pump system.

Looking at an output voltage based regulation in more detail, FIG. 3 illustrates an example of using a resistive divider feedback regulation method to generate a regulation control signal. Pump 301 produces an output having voltage value of Vout. This output is then connected to ground through elements R1 311 and R2 313 acting resistors connected in series. The current flowing through this resistive divider is then Ireg=Vout/(R1+R2). The voltage Vdiv taken from between R1 311 and R2 313 is then supplied at one input of AMP 315 where it is compared to the reference value Vref that is supplied at the other input to generate the control signal Control. This is then typically used to regulate the pump to have the voltage at the output of Vout=Vref (1+R1/R2). The control can then be fed back to regulate by pump system by various mechanisms, such as to enable or disable charge pump to maintain regulation, control the pump clock amplitude, control the frequency of pump clock, and so on.

Figure 4A:
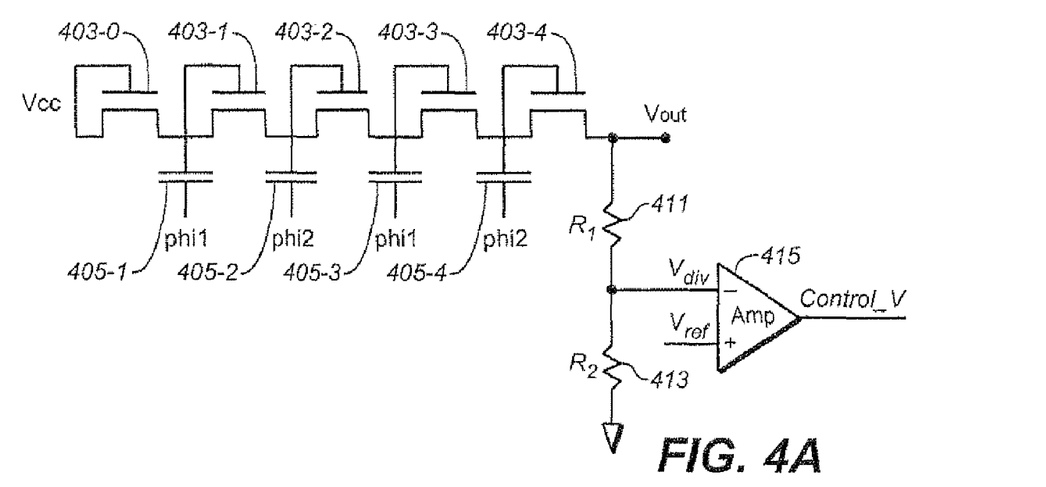
Figure 4B:
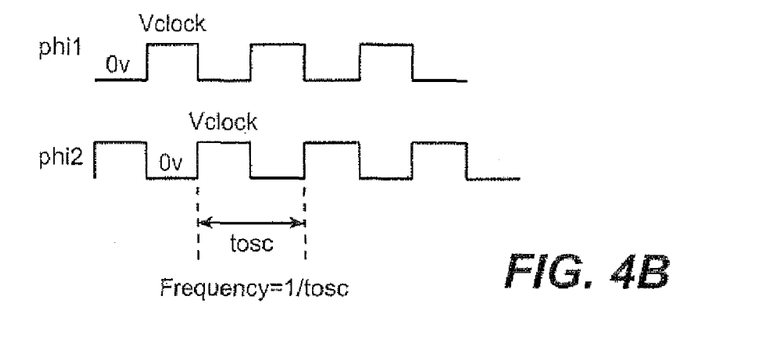

FIG. 4A is a schematic view of the pump and some regulation control circuitry that is similar to FIG. 3, but showing a particular embodiment of a pump. In FIG. 4A, R1 411, R2 413, and Amp 415 can be taken as the similar elements of FIG. 3. The charge pump is shown as a Dickson-type pump of a single branch and four stages. The 5 diodes (403-0, 403-1, 403-2, 403-3, 403-4) are formed of diode connected transistors connected in series between the input at voltage Vcc and the output node. At a node between each pair of diodes, a capacitor (405-1, 405-2, 405-3, 405-2) has one plate connected, the other plate connected to one of a pair of non-overlapping clock signals phi 1 and phi 2, the odd number capacitors connected to receive phi1 and the even numbered capacitors connected to receive phi2. FIG. 4B illustrates an example of such a pair of non-overlapping clock signals with frequency of 1/tosc, where tosc is the clock period, and amplitude of Vclock.

Figure 5:
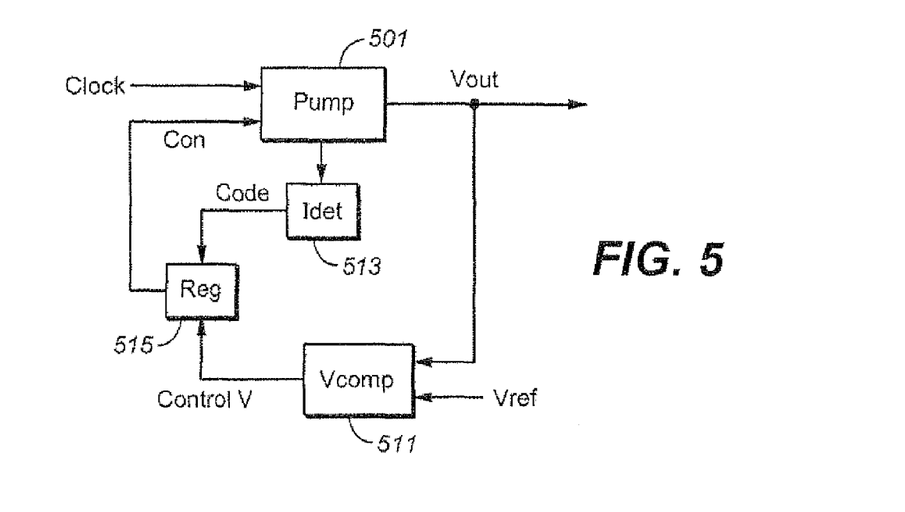
FIG. 5 is a top level diagram for a regulated charge pump system using current sensing based regulation.

A principle aspect presented here is expanding the regulation scheme to include the sensing of the current flowing out of the charge pump. This is done indirectly in a process that is complementary to, and independent of, the sort of comparison of the output's voltage level done described above. This can be illustrated schematically by FIG. 5, which can be compared with FIG. 2. As in FIG. 2, this again includes a voltage pump circuit 501 connected to receive a clock signal and provide an output having a voltage value Vout. The output voltage is then compared to a reference value Vref in the voltage comparison section Vcomp 511, which generates a first, output voltage based control signal CONTROL V. FIG. 5 now also includes a section Idet 513 connected to the pump circuit 501 to sense the current flowing out of the pump and generate a second, current based control signal. In the exemplary embodiment the current based control signal is a n-bit digital value here called Code[n-1,0]. In addition to Vcomp 511 and Idet 513, the regulation circuitry will then also include a section Reg 515 that receives the voltage based and current based control signals and generate from these the control signal CON that is supplied to the pump circuit 501, which then adapts its operation based on this signal. Some examples of this adaptation are given below. Although schematically shown here as three separate elements, it will be understood that the regulation functions of Vcomp 511, Idet 513, and Reg 515 can implemented in practice as a single circuit element or distributed in various manners across different elements.

Figure 6:
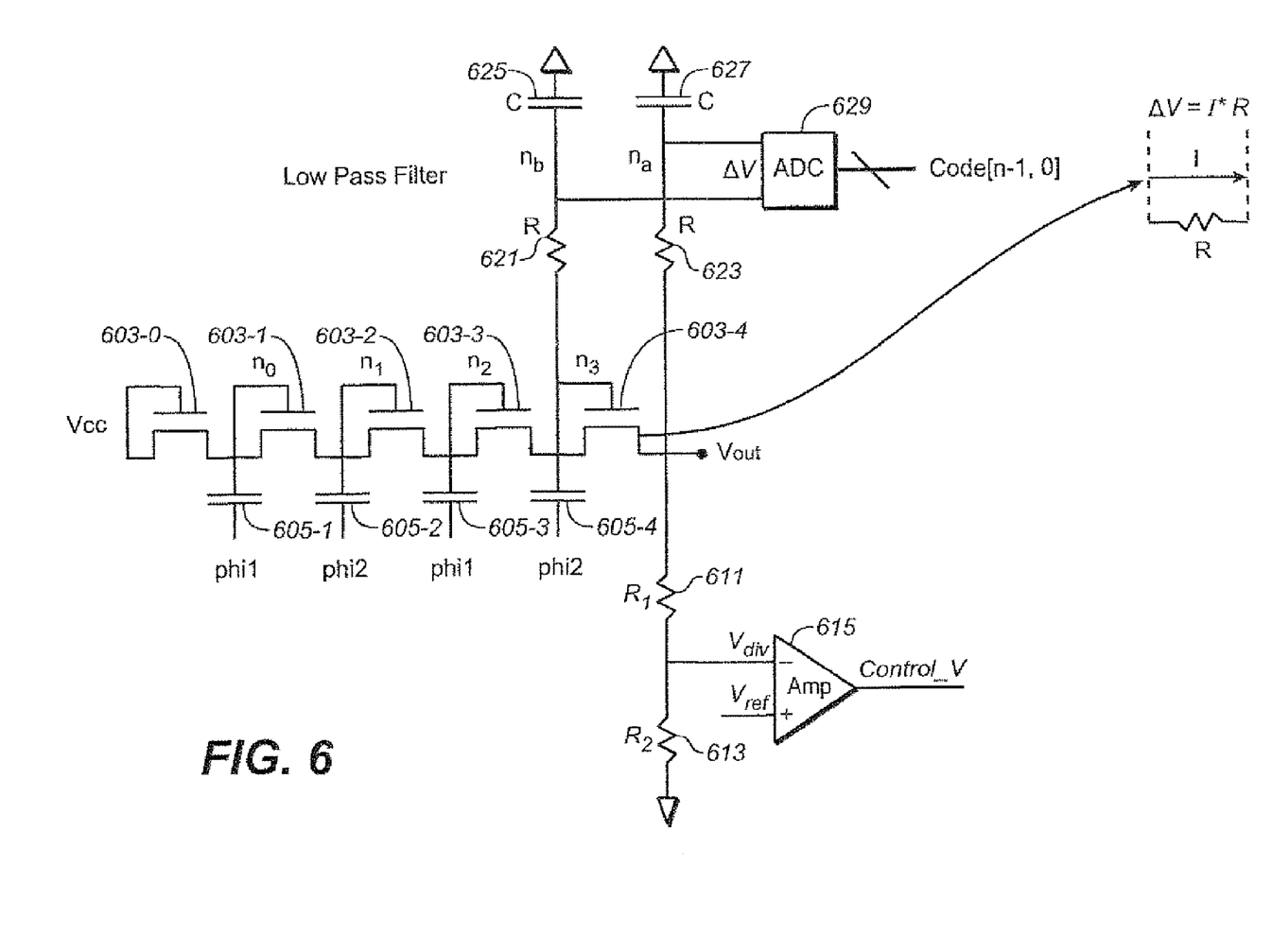
FIG. 6 shows an implementation of current sensing based regulation.

FIG. 6 illustrates some additional detail on an implementation of sensing the average current flowing through the pump. The preferred embodiments do this by sensing a current drop across a specific element that the pump current will flow through. In FIG. 6, the voltage comparison section and the pump circuit are taken to the same as in FIG. 4A, where a Dickson-type pump is again the exemplary embodiment. The last element of the pump, through with the output current will flow, is the diode 603-4, is selected to indirectly determine the current flow in the pump, although other elements in the current path could be used. Here, the last element in the pump is selected since, generally speaking, the later the element is in pump, the more accurately it will represent the current. The preferred embodiment is not limited to last stage diode and other elements can be used. As shown schematically at the upper right of FIG. 6, the diode 603-4 will have some resistance R, a current I (corresponding to the pump output current) flowing through it, and a voltage drop $\Delta V$ across it. Consequently, by determining the voltage drop $\Delta V$ across diode 603-4, the current flow can be determined since the value of R can usually be fairly well known. (Even if there is some inaccuracy in the value of R, the relative variations in I can still be determined based on changes in $\Delta V$.) In the exemplary embodiment, a digital arrangement is used where $\Delta V$ is then fed into an analog to digital converter ADC 629 to generate the n-bit control signal Code[n-1,0]. Also, rather than directly take the voltage drop across the final diode 603-4, the level on each side is run through low pass filter to smooth out the values some, with a resistor R 621 and capacitor C 625 connected in series between a node before 603-4, a resistor R 623 and capacitor C 627 connected in series between a node after 603-4, and $\Delta V$ being taken from nodes $n_a$ and $n_b$ between the respective resistors and capacitors. The filtering helps to smooth out the variations in voltage levels and provide a more accurate, and smoother, measure of the average current flowing in the pump. (Note that in this indirect determination of the current, the value of I here is based on the voltage drop within an element inside the pump, not the Ireg value shown in FIG. 3 flowing through the resistive divider that is directly proportional to Vout and would only be one component of the total current at the output node, which would also be distributed among the loads attached to the output. The voltage comparison section is usually arranged so that the current flowing in its resistive divider is fairly negligible.) If silicon area is constrained, the sample and hold ADC 629 can be used to sample the voltage across the diode 603-4. The control signals Control, Code[n-1,0], or a combination of the these can then be used to determine the regulation control signals for the pump circuit.

Figure 7:
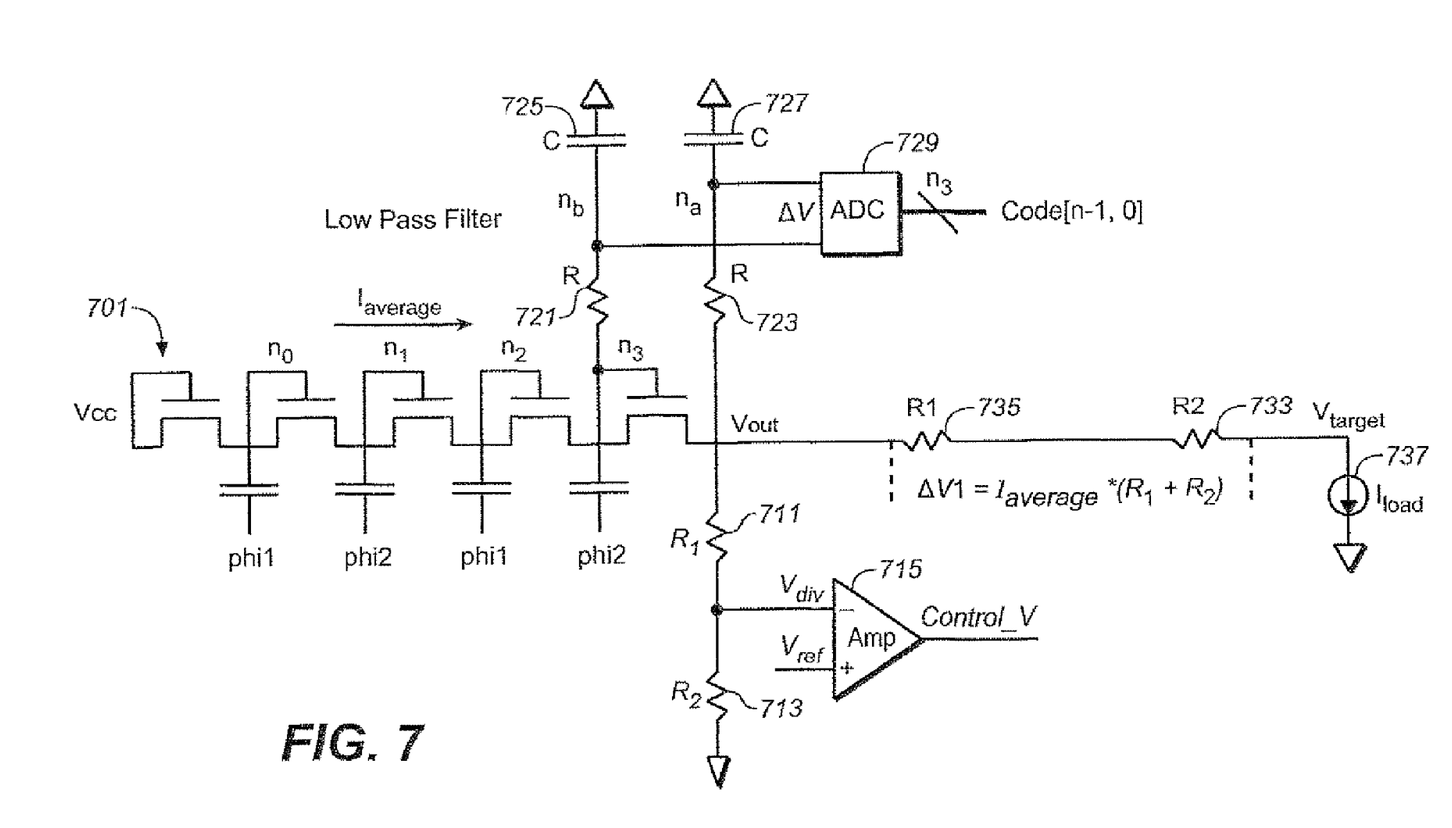
FIGS. 7-9 illustrate the usage of current sensing based regulation.

FIG. 7 illustrates the connection of the charge pump to drive a load and how the current sensing for $I_{average}$ of the pump can be used. As in FIG. 6, FIG. 7 again shows a pump circuit, voltage comparison section, and current determination section, with the corresponding elements similarly numbered. $I_{average}$ is the average current flowing in the pump and supplied to the load, where the current lost to the voltage comparison section is taken as relatively small and neglected. The output of the pump circuit is now also connected to a load 737 drawing a current $I_{load}$. The routing path between the output and load will typically have various voltage drops, here represented schematically as the resistances R1 735 and R2 733. The voltage drop, $\Delta V1$, through this routing to the load would then be $\Delta V1 = I_{average}*(R1+R2)$. Consequently, the voltage actually applied to the load, $V_{target}$, will differ from the output voltage.

To take an example, charge pumps are often used as peripheral elements on flash or other non-volatile memories. Examples of such memories are described, for example, in U.S. Pat. Nos. 7,345,928, 7,463,521, or US Pat. Pub. No. 2008/0198662 A1. In such applications, both the routing to the load, and its corresponding losses, and the load itself will vary. The desired level of Vout can then can be adjusted by use of the Code[n-1:0] control feedback to compensate for routing drop of between Vout to Vtarget. This sort of arrangement can be particularly useful if $I_{load}$ varies over the course of different operations.

Figure 8:
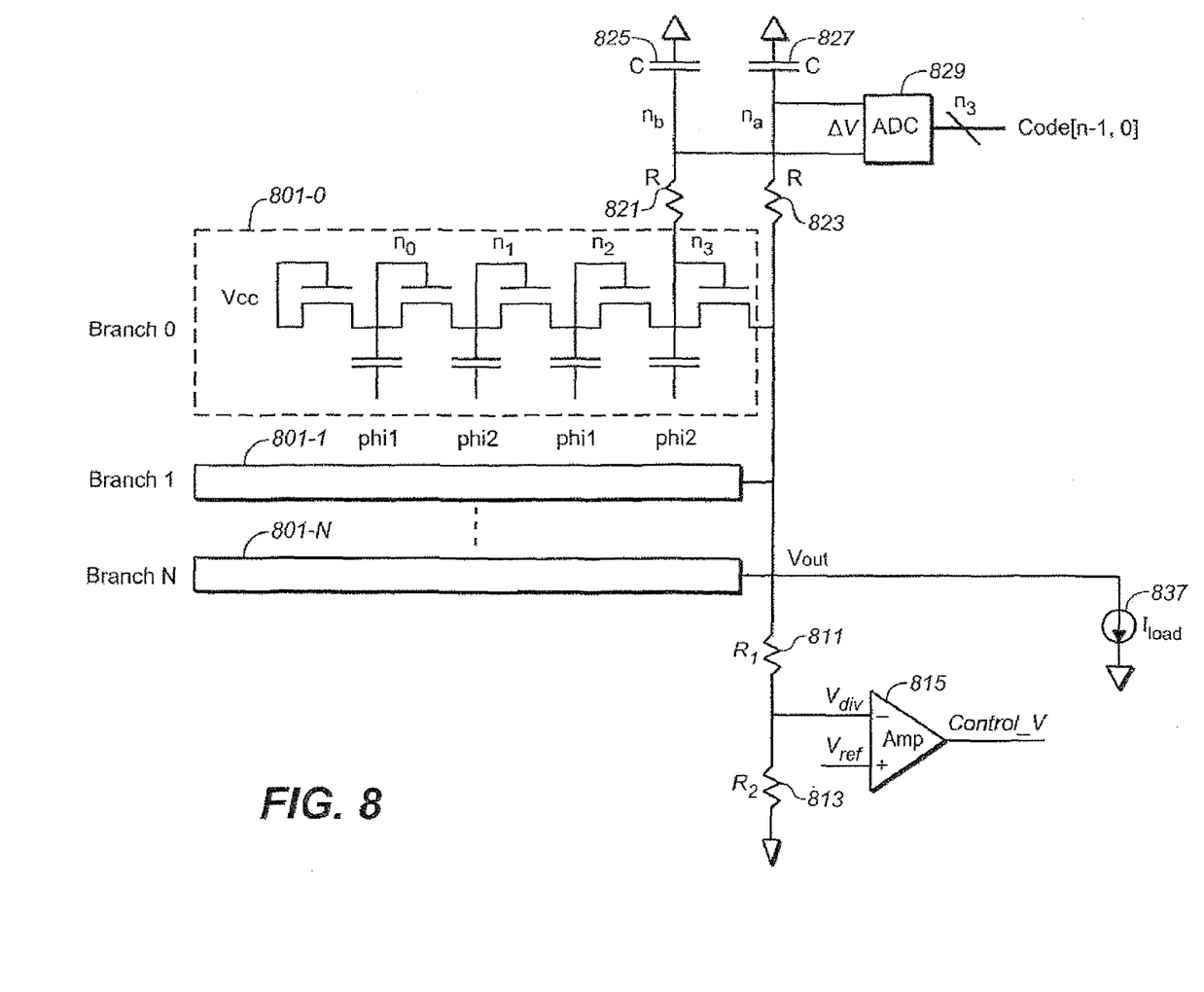

FIG. 8 illustrates one example of how the pump system can adapt the pump circuits operation based upon the regulation control signals. As in FIG. 6, FIG. 8 again shows a voltage comparison section and a current determination section, where the corresponding elements are similarly numbered, and with the output supplying Vout to the load 837. (The routing elements, such as shown schematically in FIG. 7, are omitted here for simplicity.) Now the pump circuit includes multiple branches, Branch 0 801-0, Branch 1 801-1, . . . Branch N 801-N. Only the structure of the first branch is shown explicitly and is again shown as a four stage Dickson-type pump. As before, other designs may be used; and although the discussion here will take all of the branches to be the same in design and number of stages, more generally, these can differ. Based on the control signal from REG 515 (FIG. 5), the pump strength (or number of branches) can be adjusted dynamically based on Code[n-1,0], as well as, or instead of, just the usual output voltage-based regulation. Only needed branches are enabled to achieve the desired performance for the optimal current consumption, power consumption and output ripple.

Figure 9:
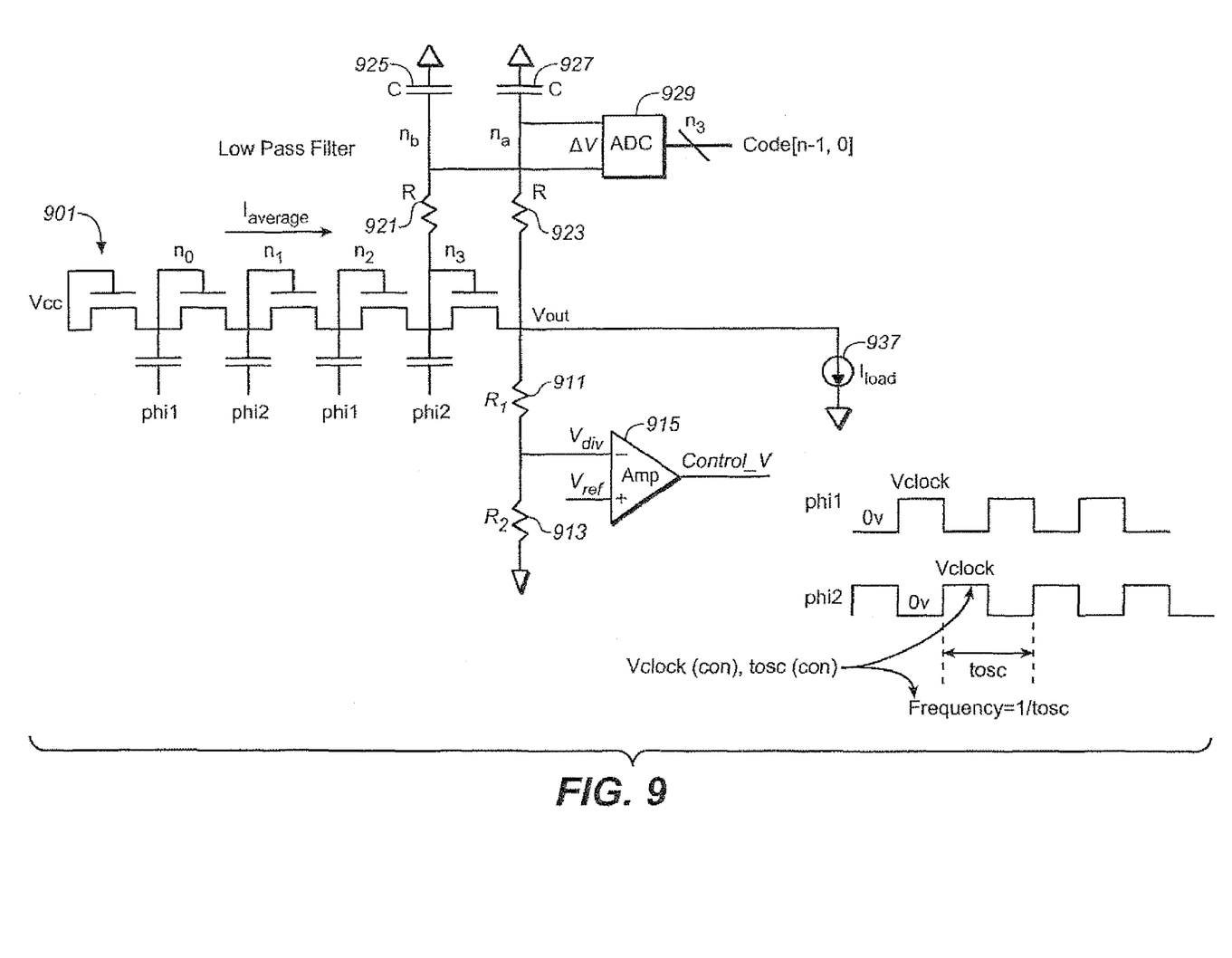

FIG. 9 illustrates other examples of how the pump system can adapt the pump circuits operation based upon the regulation control signals. As in FIG. 6, FIG. 9 again shows a voltage comparison section and a current determination section, where the corresponding elements are similarly numbered, and with the output supplying Vout to the load 937. The pump circuit 901 is here taken as a single branch, four stage Dickson type pump, the capacitors being driven by the non-overlapping clock signals phi1 and phi2 shown at left. The clock signals have a period of tosc (and frequency of 1/tosc) of amplitude Vclock. As before, the clock generator is not explicitly shown, but can be taken as externally supplied or part of the charge pump system. For example, FIG. 5 could be modified by including a clock generating circuit to generate phi1 and phi2 to supply to the charge pump 501 and that would receive the control signal from REG 515 and adjust the clock signals accordingly. In the embodiment of FIG. 9, the pump circuit can be adapted so that the clock frequency, the clock amplitude, or both can be dynamically adjusted to minimize the power consumption and ripple on output of pump.

In addition to varying the number of branches or altering the clock signals, the regulation control signals can be used to vary the change pump operation in other ways, such as altering the number of active stages in a branch, or branches, for example. Further, it should be noted that these different ways of having the charge pump adapt its behavior are largely complimentary and can be variously combined. In any of these cases, the sensing of the current flowing through the pump give one more degree of freedom to be able to adjust pump parameters.

Although the invention has been described with reference to particular embodiments, the description is only an example of the invention's application and should not be taken as a limitation. Consequently, various adaptations and combinations of features of the embodiments disclosed are within the scope of the invention as encompassed by the following claims.

It is claimed:

1. A charge pump circuit system, including:
   a charge pump circuit, connected to receive an input voltage and generate therefrom an output having a voltage level; and
   regulation circuitry connected to the charge pump circuit, including:
      a voltage comparison section connected to receive the output and a reference voltage and derive from the voltage level the output and. the reference voltage a first control signal;
      a current determination section connected to the charge pump circuit to indirectly determine the amount of current flowing therethrough and determine a second control signal based upon the determined amount of current; and
      a pump control section connected to receive the first and second control signals and derive therefrom a third control signal,
   wherein the charge pump system adapts the operation of the charge pump circuit in response to the third control signal, and
   wherein the current determination section is connected to a first node and a second node in the charge pump circuit to determine a voltage drop across an element of the charge pump circuit that is connected between the first and second nodes and includes:
      an analog to digital converter connected having a first input connected to the first node, a second input connected the second node, and an output providing the second control signal as a multi-bit digital signal.

2. The charge pump system of claim 1, wherein the voltage comparison section includes:
   a first resistive element and a second resistive element connected in series between the output and ground; and
   a comparator circuit having a first input connected to a node between the resistive elements, a second input connected to receive the reference voltage, and an output providing the first control signal.

3. The charge pump system of claim 1, where the element of the charge pump circuit that is connected between the first and second nodes is a diode element.

4. The charge pump system of claim 1, wherein the current determination section includes:
   a first low pass filter connected to the first node; and
   a second low pass filter connected to the second node, where the second control signal is determined from the voltage drop across the element of the charge pump circuit that is connected between the first and second nodes using the filtered voltage levels of the first and second nodes.

5. The charge pump system of claim 4, wherein each of the first low pass filters includes a capacitive element and a resistive element connected in series.

6. The charge pump system of claim 1, wherein the charge pump circuit includes:
   a plurality of N diode element connected in series at (N-1) nodes, where N is a positive integer greater than 1; and
   (N-1) capacitors, each having a first plate connected to a corresponding one of the (N-1) nodes and a second plate connected to receive a clocked waveform.

7. The charge pump system of claim 6, wherein each of the diode elements is formed of a diode connected transistor.

8. The charge pump system of claim 1, wherein the charge pump circuit is connected to receive a clock signal and has an output dependent upon the clock signal, wherein the charge pump system adapts the operation of the charge pump circuit in response to the third control signal by changing the frequency of the clock signal.

9. The charge pump system of claim 1, wherein the charge pump circuit is connected to receive a clock signal and has an output dependent upon the clock signal, wherein the charge pump system adapts the operation of the charge pump circuit in response to the third control signal by changing the amplitude of the clock signal.

10. The charge pump system of claim 1, wherein the charge pump circuit includes a variable number of stages and the charge pump system adapts the operation of the charge pump circuit in response to the third control signal by changing the number of stages that are active.

11. The charge pump system of claim 1, wherein the charge pump system adapts the operation of the charge pump circuit in response to the third control signal to compensate for a routing voltage drop in driving a load to which the output is connected.

12. The charge pump system of claim 11, wherein the load is part of a non-volatile memory array.

13. A charge pump circuit system, including:
   a charge pump circuit, connected to receive an input voltage and generate therefrom an output having a voltage level; and
   regulation circuitry connected to the charge pump circuit, including:
      a voltage comparison section connected to receive the output and a reference voltage and derive from the voltage level the output and the reference voltage a first control signal;
      a current determination section connected to the charge pump circuit to indirectly determine the amount of current flowing therethrough and determine a second control signal based upon the determined amount of current; and
      a pump control section connected to receive the first and second control signals and derive therefrom a third control signal,
   wherein the charge pump system adapts the operation of the charge pump circuit in response to the third control signal, and wherein the charge pump circuit includes a variable number of branches arranged in parallel to generate the output and the charge pump system adapts the operation of the charge pump circuit in response to the third control signal by changing the number of the branches that are active.

14. The charge pump system of claim 13, wherein the voltage comparison section includes:
   a first resistive element and a second resistive element connected in series between the output and ground; and
   a comparator circuit having a first input connected to a node between the resistive elements, a second input connected to receive the reference voltage, and an output providing the first control signal.

15. The charge pump system of claim 13, wherein the current determination section is connected to a first node and a second node in the charge pump circuit to determine a voltage drop across an element of the charge pump circuit that is connected between the first and second nodes.

16. The charge pump system of claim 15, where the element of the charge pump circuit that is connected between the first and second nodes is a diode element.

17. The charge pump system of claim 15, wherein the current determination section includes:
   an analog to digital converter connected having a first input connected to the first node, a second input connected the second node, and an output providing the second control signal.

18. The charge pump system of claim 15, wherein the current determination section includes:
   a first low pass filter connected to the first node; and
   a second low pass filter connected to the second node, where the second control signal is determined from the voltage drop across the element of the charge pump circuit that is connected between the first and second nodes using the filtered voltage levels of the first and second nodes.

19. The charge pump system of claim 18, wherein each of the first low pass filters includes a capacitive element and a resistive element connected in series.

20. The charge pump system of claim 13, wherein the charge pump circuit includes:
   a plurality of N diode element connected in series at (N-1) nodes, where N is a positive integer greater than 1; and
   (N-1) capacitors, each having a first plate connected to a corresponding one of the (N-1) nodes and a second plate connected to receive a clocked waveform.

21. The charge pump system of claim 20, wherein each of the diode elements is formed of a diode connected transistor.

22. The charge pump system of claim 13, wherein the charge pump circuit is connected to receive a clock signal and has an output dependent upon the clock signal, wherein the charge pump system adapts the operation of the charge pump circuit in response to the third control signal by changing the frequency of the clock signal.

23. The charge pump system of claim 13, wherein the charge pump circuit is connected to receive a clock signal and has an output dependent upon the clock signal, wherein the charge pump system adapts the operation of the charge pump circuit in response to the third control signal by changing the amplitude of the clock signal.

24. The charge pump system of claim 13, wherein the charge pump circuit includes a variable number of stages and the charge pump system adapts the operation of the charge pump circuit in response to the third control signal by changing the number of stages that are active.

25. The charge pump system of claim 13, wherein the charge pump system adapts the operation of the charge pump circuit in response to the third control signal to compensate for a routing voltage drop in driving a load to which the output is connected.

26. The charge pump system of claim 25, wherein the load is part of a non-volatile memory array.

* * * * *